(12) United States Patent
Cambo et al.

(10) Patent No.: US 8,545,607 B2
(45) Date of Patent: Oct. 1, 2013

(54) PLEATABLE COMPOSITE FILTER MEDIA

(75) Inventors: William H. Cambo, Rollinsford, NH (US); Ming T. Huang, Bellevue, WA (US)

(73) Assignee: Lydall, Inc., Manchester, CT (US)

(*) Notice: Subject to any disclaimer, the term of this patent is extended or adjusted under 35 U.S.C. 154(b) by 54 days.

(21) Appl. No.: 13/390,753

(22) PCT Filed: Aug. 17, 2010

(86) PCT No.: PCT/US2010/045738
§ 371 (c)(1),
(2), (4) Date: Feb. 16, 2012

(87) PCT Pub. No.: WO2011/022382
PCT Pub. Date: Feb. 24, 2011

(65) Prior Publication Data
US 2012/0144790 A1    Jun. 14, 2012

Related U.S. Application Data

(60) Provisional application No. 61/234,856, filed on Aug. 18, 2009.

(51) Int. Cl.
*B01D 53/22*    (2006.01)
(52) U.S. Cl.
USPC .............. 96/11; 95/43; 95/45; 96/6; 96/7; 96/4; 55/486; 55/487; 55/522
(58) Field of Classification Search
USPC ............ 95/43, 45; 96/4, 6, 7, 11; 55/486, 55/487, 522
See application file for complete search history.

(56) References Cited

U.S. PATENT DOCUMENTS

| | | | | |
|---|---|---|---|---|
| 3,721,642 | A | * | 3/1973 | Schalin et al. ............... 523/500 |
| 4,263,184 | A | * | 4/1981 | Leo et al. ...................... 524/35 |
| 4,687,697 | A | * | 8/1987 | Cambo et al. ................ 428/201 |
| 5,789,329 | A | * | 8/1998 | Eastes et al. .................. 501/36 |
| 6,277,777 | B1 | * | 8/2001 | Xu et al. ...................... 501/70 |
| 6,334,881 | B1 | | 1/2002 | Giannetta et al. |
| 6,358,871 | B1 | * | 3/2002 | Sircar .......................... 501/35 |
| 6,415,104 | B1 | * | 7/2002 | Fitts et al. ..................... 392/503 |
| 6,966,252 | B2 | | 11/2005 | Hamiel et al. |
| 2003/0117765 | A1 | * | 6/2003 | Sagal ........................... 361/302 |
| 2003/0207628 | A1 | * | 11/2003 | Pierce .......................... 442/85 |
| 2007/0163218 | A1 | * | 7/2007 | Keeler et al. ................. 55/486 |

FOREIGN PATENT DOCUMENTS

JP    2008049333    6/2008
WO   WO2011022382   2/2011

OTHER PUBLICATIONS

Machine Translation Kunihiro et al. JP2008-049333 Jun. 3, 2008.*
Notification Concerning Transmittal of the International Preliminary Report on Patentability, issued in International Patent Application No. PCT/US2010/045738 on Mar. 1, 2012; 6 pages.
International Search Report and Wrtten Opinon of the International searching Authority, or the Declaration issued in International Application No. PCT/US2010/045738 dated Apr. 15, 2011; 9 pages.

* cited by examiner

*Primary Examiner* — Jason M Greene
*Assistant Examiner* — Anthony Shumate
(74) *Attorney, Agent, or Firm* — Cantor Colburn LLP

(57) ABSTRACT

A pleatable, high efficiency composite gas filtration media is provided. The media includes an essentially boron free chopped strand glass backer layer and media layer comprising a synthetic material. The composite media exhibits excellent pleatability, low boron out gassing, and low organic out gassing, with filtration performance comparable to existing commercial membrane composites.

15 Claims, 2 Drawing Sheets

PLEATABLE COMPOSITE FILTER MEDIA

TECHNICAL FIELD

The present invention relates to a backer for use in pleatable composite filter media, and composite filter media including the backer. More specifically, composite filter media including a backer made with a low boron chopped strand glass fiber and a membrane are provided, as well as methods for manufacturing and use of such composite media.

BACKGROUND

Filtration media has been developed that will remove particles smaller than 1 micron from gas streams, e.g. air. Filters employing such media are commonly referred to as HEPA (High Efficiency Particulate Air), ULPA (Ultra Low Penetration Air), Prefilter Media, and ASHRAE (American Society for Heating, Refrigeration and Air Conditioning Engineers—Standard 52.2) filters. Such filters may, for example, be used for reducing particulate contamination in clean rooms, for HVAC (heating, ventilating and air conditioning) systems, for protecting equipment, processes and people from contaminants.

It is often desirable in high efficiency filters to pleat the filter media to obtain a filter with increased surface area maintaining high efficiency and low pressure drop. The pleated media is placed in a filter frame to form a completed filter. In such case, the filter media surface area is substantially greater than the planar area of the filter frame. For example, U.S. Pat. No. 5,993,501, which is incorporated herein by reference, discloses composite filter media, suitable for pleating, in which a fibrous filtration layer made of air laid glass fibers, is supported with a non-woven air laid scrim.

Today, the usual standard high efficiency filter media is made from a mixture of glass microfiber and chopped strand glass fibers with binders. The media is made by a wet laid process. More specifically, high efficiency filtration media has been made using borosilicate glass microfibers and E-glass chemistry chopped strand glass bound together by acrylic resin and produced by a wet laid papermaking process. "E-glass" or electrical grade glass was originally developed for stand off insulators for electrical wiring. It was later found to have excellent fiber forming capabilities and is typically used as the reinforcing material in fiberglass. E-Glass is a low alkali glass with a typical nominal composition of $SiO_2$ 54 wt %, $Al_2O_3$ 14 wt %, CaO+MgO 22 wt %, $B_2O_3$ 10 wt % and $Na_2O+K_2O$ less then 2 wt %. Some other materials may also be present at impurity levels. This provides media that exhibits good filtration performance while exhibiting the physical characteristics required for constructing a pleated media pack for assembly into a rigid filter frame.

Borosilicate glass and E-glass fibers contain relatively high amounts of boron. As noted above, composite filter media are used in clean rooms in the electronics industry. Boron is known contaminant of semiconductor wafers, and low levels of boron contamination can adversely affect the properties of these wafers. Reduction of semiconductor device yields has been traced to relatively low levels of boron contamination which causes counter-doping of lightly doped n-type layers. Accordingly, it would be desirable to reduce or eliminate sources of boron, including glasses containing boron that are used to manufacture composite filter media. However, as will be appreciated, the reduction or elimination of boron from chopped strand glass may require modifications to the composite filter media manufacturing process, including additional amounts of binder and different types of binder to provide a suitable composite filter media. In addition, the reduction or elimination of boron from the chopped strand glass and the amount of chopped strand glass that is used in a backer for pleating to a synthetic membrane layer must provide sufficient rigidity to provide pleatability of the composite filter media. Furthermore, the properties of the ultimate composite filter media such as filtration efficiency and outgassing must be suitable for the intended end use.

More recently, developments in synthetic (polypropylene, polyester, etc.) fibers have provided low-boron fibers that can be used in combination with or in place of borosilicate glass, and E-glass chopped strand fibers. Composites using a charged nonwoven layer and a layer of carded fibers or spunbonded fibers are thermally bonded, or adhered, or hydroentangled, or needle-punched to the electrically charged layer to produce a media that approaches HEPA performance in a pleated filter. Although filtering performance of such composites is generally satisfactory and boron can be eliminated from the composite in this manner, products incorporating synthetic membranes pleat poorly and manufacture using conventional glass pleating machines generally does not produce the sharp pleats required.

It would be desirable to provide a composite filter media exhibiting excellent pleating characteristics on existing glass pleating machines, low potential for boron out gassing, with filtration performance comparable to existing commercial membrane composites such as membrane spun bonded composite filter media. It would also be desirable to provide such a composite filter media that also exhibits low organic out gassing.

SUMMARY

One aspect of the invention pertains to a backer for use with a composite filter media comprising chopped glass strand fiber, the glass strands essentially free of boron in an amount greater than 50% by weight; and a binder, wherein the backer is pleatable with a synthetic membrane layer.

Another aspect of the invention pertains to a composite filter media comprising a backer layer comprising greater than 50% by weight chopped strand glass that is essentially free of boron; and at least one synthetic membrane layer laminated to the backer layer, the composite filter media in a pleated configuration. In one embodiment, the synthetic membrane layer is selected from the group consisting of porous polyethylene, PTFE, nylon, polyester, polypropylene, and combinations thereof. In one embodiment, the membrane layer has a a particle filtration, PF, value of at least 10, which is calculated according to the formula:

$$PF=(-\log(\text{Penetration (\%)}/100)/\text{Pressure loss (mm } H_2O))\times 100$$

in which the Penetration (%)=100-Collection efficiency at a Pressure loss (unit: mm $H_2O$) measured when air is flowing through the membrane at a flow velocity of 5.3 cm/second and a collection efficiency (unit: %) measured using dioctyl phthalate (DOP) or di-ethyl-hexyl sabacate (DEHS) having a particle size of 0.3 μm (U.S. Military Standard MIL-STD-282 (1956)), specifically the PF value of the membrane is at least 20, and most specifically the PF value of the membrane is at least 30, wherein the porous membrane is a polyethylene membrane. PF is also commonly referred to as an α-Value, a Figure of Merit or a Quality Factor, as will be generally understood by those of ordinary skill in the art.

Another aspect relates to a method of manufacturing a composite filter media comprising laminating together a backer layer comprising greater than 50% by weight chopped strand glass fiber that is essentially free of boron and a synthetic membrane to form a pleated composite filter media; and pleating the composite filter media, to provide a filter media in which the pleated composite filter media shows excellent pleating characteristics on existing glass pleaters (e.g., Tag pleaters and Solent Pleaters Solent Technology, Inc., Columbia, S.C.)) resulting from the amount of chopped strand glass fiber in the backer. It will be appreciated that a composite filter media that requires a redesign of existing pleating machines will generally not be acceptable from a cost standpoint. Therefore, a demonstration of excellent pleating characteristics on existing glass pleaters is highly desirable.

In one or more embodiments, the composite filter media exhibits one or more of the following properties: Low boron outgassing; low organic outgassing; and sufficient stiffness in the composite to pleat well on existing glass pleaters as well as sufficient stiffness to add structural integrity to the finished filter to minimize pressure drop at application velocity in use or rated flow. In at least one embodiment, the low boron chopped strand glass fiber has an average fiber diameter of from about 3.8 to about 10 microns. In specific embodiments, the low boron chopped strand glass fiber has an average fiber diameter of from about 6.5 to about 7.5 microns. As used herein, "low boron outgassing" and "low organic outgassing" refer to composite filter media that exhibit one or more of 1/5, 1/10, 1/15, 1/20, 1/30, 1/40, 1/50, 1/60, 1/70, 1/80 1/90, 1/100, 1/150, 1/200, 1/250, and 1/300 of the boron outgassing and/or organic outgassing as compared to a conventional composite filter media made with E-glass chemistry chop strand fiber. This can be determined by comparative testing with conventional composite filter media and composite filter media in accordance with embodiments of the present invention.

According to one embodiment, the backer further comprises synthetic fiber selected from one or more of polyester, nylon, polypropylene, rayon, low melt fibers, acrylic fibers, polyvinyl alcohol, bicomponent fibers, and cellulosic fibers. In one embodiment, the backer has a porosity ranging from about 200 to 800 cfm (94,389 to 377,558 cm³/second). In a specific embodiment, backer has a porosity ranging from about 300 to about 600 cfm (141,584 to 283,168 cm³/second) so as to not significantly increase the resistance of the composite loading to lower PF values.

The backer can be located on one or more of an upstream or downstream side of the filter. In specific embodiments, the backer is located on the upstream side of the filter to reduce fiber shedding. In one embodiment, the composite filter media comprises the backer sandwiched between two synthetic membrane layers.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Figure 1:
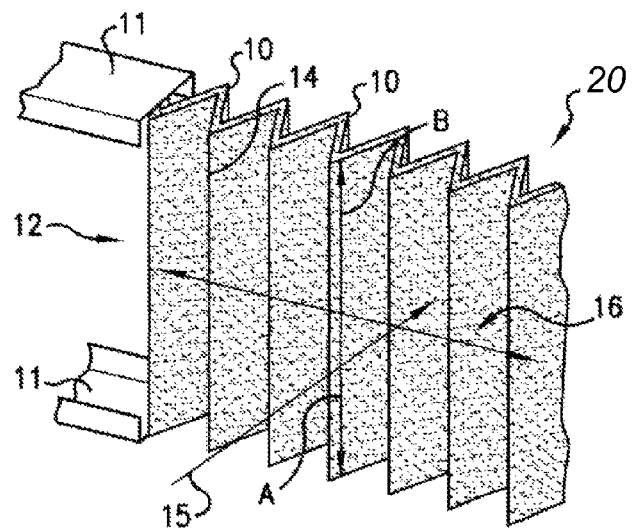
FIG. 1 is a schematic perspective view, with a portion broken away, of a pleated filter using the composite media filter according to an embodiment of the invention.
Figure 2:
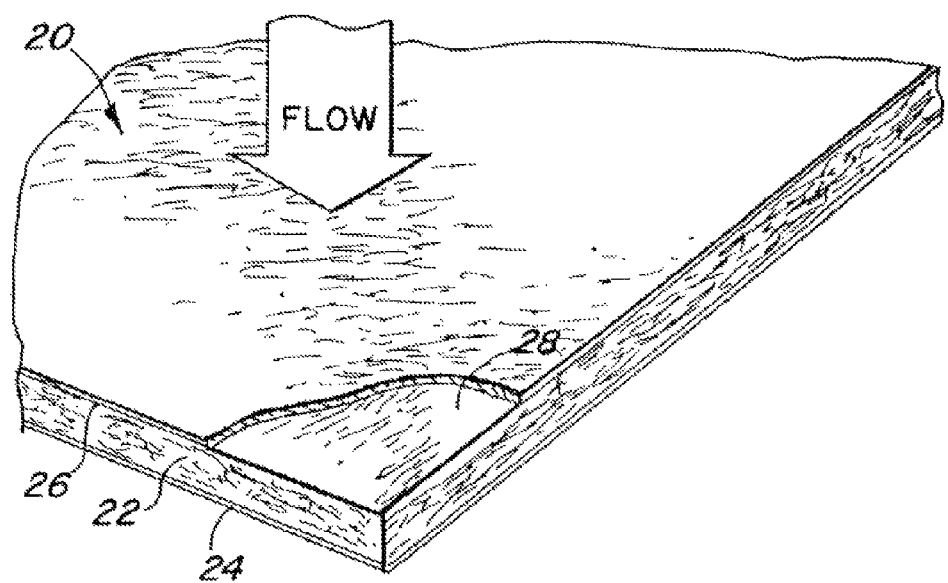
FIG. 2 is a schematic perspective of an embodiment of a composite filter media according to an embodiment of the invention.

Referring to FIG. 1, which shows a pleated filter 12 and incorporating the composite filter media 20 shown in FIG. 2. The composite filter media 20 can be formed into a pleated configuration having pleats 10 as shown in FIG. 1. The pleated configuration of the media 20 is held in a frame 11 (for example, an aluminum, wood or plastic frame), forming the filter 12.

The skilled artisan will readily appreciate that the surface area of the pleated filter media in FIG. 1 is much greater than the planar area of the filter 12 formed by frame 11, as shown by arrows A and B. Thus, for high efficiency filters, which must be constrained within a nominal filter area, the pleated filter media provides a much higher filter media surface area than would a flat filter media. Accordingly, pleating is important in such filters and the ability to pleat the filter media is, likewise, of importance. It will also be noted from FIG. 1 that the pleats 10 are in the form of angular pleats having a sharp leading edge 14. Such a sharp leading edge 14, as opposed to an irregular edge, substantially reduces turbulence of an air stream 15 striking the media face, generally 16 and reduces exit and entrances losses resulting in a filter with lower resistance and improved laminar flow.

Referring now to FIG. 2, the composite filter media 20 according to embodiments of the present invention includes a pleatable, low boron chopped strand glass fiber backer layer 22, which enables the composite filter media 20 to be scored or creased, pleated and to retain its pleats. The composite filter media 20 may also include an upstream layer covering at least a portion of or the entire backer layer 22, an optional thin, permeable, flexible covering layer 26, for example, any type of scrim with continuous fiber that does not have loose fiber, to protect the low boron chopped strand glass fiber layer 22 from abrasion and block the loss of fibers from the low boron chopped strand glass fiber backer layer 22. A downstream layer of the composite filter media 20 may be a permeable membrane layer 24 made from a suitable material, as described more fully below. Other variants are within the scope of the invention.

According to one or more embodiments, a composite filter media 20 is provided that has excellent pleating characteristics on commercially available glass pleating machines. A feature of the composite filter media according to one embodiment is that the composite filter media exhibits low out gassing of boron and organic components. The components of the composite filter media, the backer layer 22 and the membrane layer 24 will be described in more detail below.

Backer Layer

According to one or more embodiments, a low boron chopped strand glass backer layer is produced uniformly on a wet laid paper machine using low boron chopped strand glass and binders. Examples of suitable binders include binder fiber, which can be used alone or in combination with suitable binders such as an acrylate binder. After a suitable backer is produced having acceptable physical properties and exhibiting suitable fiber tie down, the backer is then laminated to a membrane to form the composite filter media.

The low boron chopped strand glass fiber has a very low concentration of boron in the glass chemistry compared to regular E-glass chemistry chopped strand glass fiber contributing to low potential for boron out gassing in the membrane laminate. The high concentration of low boron chopped strand glass fiber in the backer also improves the pleatability of the laminate on existing glass pleaters and adds structurally integrity to a pleat pack including a glass backer made in accordance with one or more embodiments of the invention. In addition, the backer contains low organic content, for example, less than about 50% by weight, less than about 15% by weight or less than about 5% by weight, which provides a filter composite that exhibits lower out gassing of boron and organic components than conventional composite filter media. As used herein, "low boron" chopped strand glass refers to a glass fiber that is essentially free of boron. "Essentially free" is intended to mean that the glass composition contains at most only a trace quantity of boron from impurities in the raw materials used to manufacture the glass, for example, less than about 1.0 weight percent, less than about 0.5% by weight boron, less than about 0.2% by weight boron, less than about 0.1% by weight boron, less than about 0.075% by weight boron, and in specific embodiments no detectable levels of boron.

A higher organic content in a filter media results in a higher potential for high out gassing of organic material from the composite filter media. A test to measure the level of outgassing is Institute of Environmental Sciences and Technologies IEST-AP-CC 031.2. An acceptable level of organic components in the backer layer can be tested by heating a sample of backer layer to an elevated temperature, for example, up to about 50° C. or up to about 100° C. in a closed container, and out gassing can be measured using a Thermodesorber-Gas Chromatograph-Mass Spectrometer System (TD-GC-MS).

Examples of suitable binders include, but are not limited to acrylate binders, polyvinyl acetate, styrenated binders, polyvinyl alcohol, and copolymers. Alternatively, as described below, the binder may be substantially reduced or eliminated by using a mixture of low boron chopped strand glass fibers and binder fibers.

An example of a suitable low boron chopped stand glass fiber is available from Owens Corning of Toledo, Ohio under the Trademark ADVANTEX. The fibers have an average diameter in the range of about 3.8 to 18.5 microns in diameter. A more specific average diameter range of the glass fibers is in the range of about 3.8 to 10 microns, and more specifically the average fiber diameter is in the range of about 4.8 to 7.5 microns, for example, about 6.5 microns to 7.5 microns. A suitable example of such a glass fiber is described in U.S. Pat. No. 5,789,329, the entire content of which is incorporated herein by reference. A non-limiting example of a low boron fiber composition is exemplified as comprising 50 to 70 weight percent $SiO_2$, 15 to 30 weight percent CaO, 10 to 20 weight percent $Al_2O_3$, 1.0 to 8 weight percent MgO, 0 to 1.5 weight percent $F_2$, 0.1 to 5 weight percent $Na_2O$, 0 to 2 weight percent $TiO_2$, 0 to 1 weight percent $Fe_2O_3$, 0 to 4 weight percent $K_2O$, and 0 to 1 weight percent $SO_3$, with a specific composition comprising 59 to 62 weight percent $SiO_2$, 20 to 24 weight percent CaO, 12 to 15 weight percent $Al_2O_3$, 1.0 to 4 weight percent MgO, 0 to 0.5 weight percent $F_2O_3$, 0.1 to 2 weight percent $Na_2O$, 0 to 0.9 weight percent $TiO_2$, 0 to 0.5 weight percent $Fe_2O_3$, 0 to 2 weight percent $K_2O$, and 0 to 0.5 weight percent $SO_3$. It will be understood that the invention is not limited to a particular glass composition for the backer, however, the glass composition should be essentially free of boron. For comparison of Low Boron and E-glass chop strand glass chemistry, Table 1 follows:

TABLE 1

CHOP STRAND GLASS CHEMISTRY

|  | E-GLASS % | LOW BORON % |
|---|---|---|
| $SiO_2$ | 54.0-55.0 | 59.0-62.0 |
| $Al_2O_3$ | 14.0-15.0 | 12.0-15.0 |
| $B_2O_3$ | 7.0-8.0 | 0 |
| CaO | 18.0-21.0 | 20.0-24.0 |
| MgO | 0.3-3.0 | 1.0-4.0 |
| $Na_2O$ | 0-<2.0 | 0.1-2.0 |
| $K_2O$ | 0-0.4 | 0-2.0 |
| $SO_3$ | 0 | 0-0.5 |
| $TiO_2$ | 0.5-0.6 | 0-0.9 |
| $F_2$ | 0-1.0 | 0-1.5 |
| $Fe_2O_3$ | 0 | 0-0.5 |

According to one or more embodiments, a sufficient amount of low boron chopped strand glass fiber is used in the backer to maintain excellent pleating characteristics of a composite filter media on existing glass pleating machines, and the backer provides structural support for the finished composite filter media. In one embodiment, the backer comprises at least about 40% by weight of low boron chopped strand glass fiber. In other embodiments, the amount of low boron chopped strand in the backer comprises at least about 50%, 55%, 60%, 65%, 70%, 75%, 80%, 85%, 90%, 95% and up to 100% by weight of the backer, excluding binder. In embodiments in which there is less than 100% by weight low boron chopped fibers, a portion of the remaining backer may comprise a synthetic fiber blended with the low boron chopped strand glass fiber. An example of a suitable synthetic fiber is a bicomponent sheath core low melt polyester fiber. The synthetic fiber can have any acceptable range of sizes, for example, 2 denier. In specific embdodiments, the backer comprises at least 80% by weight low boron chopped fibers, more particularly, at least 85% by weight, and more specifically, at least 90% or 95% by weight, with the remainder being synthetic fiber, for example, polyvinyl alcohol binder fiber. An example of suitable polyvinyl alcohol binder fiber is sold under the trade name KURALON™ 105-2 from the Kuraray Company of Tokyo, Japan.

In one or more embodiments, the backer has sufficient porosity to have minimal impact resistance on resistance of the composite. Porosity can be measured using a Frazier air permeability tester to rate the air flow thru a sample at 0.5 inch water gauge. According to one embodiment, a suitable Frazier value is 450 cfm/ft$^2$ (229 cm$^3$/sec/cm$^2$). The Frazier value can be lowered by increasing the basis weight or the binder content to reduce the Frazier number. The lower limit of the Frazier number can be determined experimentally to determine the point at which the backer has an unacceptably high impact on pressure resistance of the composite filter media.

The backer can be produced using any suitable process such as a wet laid process. For example, the backer layer can be made from low boron chopped strand glass fibers on any suitable papermaking machine. In one or more embodiments, a delta-former, a rotoformer, incline wire fourdrinier, or fourdrinier machine may be used since these machines are capable of producing significantly thick layers of the wet laid fibers with a fairly concentrated dispersion thereof and produce a uniform layer. When using a delta-former machine, the dispersion of the fibers in the forming area can be up to 1% by weight, but they are typically 1% or lower. The backer layer should have sufficient stiffness, strength and porosity suitable to produce a composite filter membrane having acceptable properties of the end use as a filter. A suitable range of thickness for the backer layer is in the range of about 0.002 and about 0.050 inches (about 0.00508 and 0.127 cm respectively), more specifically about 0.0035 to about 0.015 inches (about 0.00889 and 0.0381 cm respectively), for example about 0.011 inches (about 0.02794 cm).

Membranes

The membrane to which the backer is laminated can be any suitable membrane made from a synthetic material such as polyethylene, PTFE, ePTFE, nylon and ultra high molecular weight polyethylene. In a specific embodiment, the membrane is an ultra high molecular weight polyethylene. Specific examples of such ultra high molecular weight polyethylene membranes are disclosed in U.S. Pat. No. 6,127,501, the entire content of which is incorporated herein by reference. In one highly specific embodiment, a membrane layer may be a SOLUPOR® membrane, available from Lydall Solutech B.V.

An example of a polyethylene membrane includes a stretched polyethylene membranes. These membranes can have a porosity of at least 20% and an intrinsic viscosity of at least 5 dl/g. Such membranes can be shrunk to at least 95% of their critical shrink factor.

In another specific embodiment, the membrane layer comprises a porous polyethylene membrane having a particle filtration, PF, with a value of at least 10, 15, 20, 25 or 30. The PF value is calculated according to the formula:

$$PF=(-\log(\text{Penetration }(\%)/100)/\text{Pressure loss (mm H}_2\text{O)})\times 100,$$

in which the penetration (%)=100-Collection efficiency at a Pressure loss in mm $H_2O$ measured when air is flowing through the membrane at a flow velocity of 5.3 cm/second and a collection efficiency (in %) measured using dioctyl phthalate having a particle size of 0.3 µm. This corresponds to the U.S. Military Standard MIL-STD-282 (1956).

"Porous" means that the membrane has a plurality of open micro pores. In one embodiment, the average pore size is at least 0.5 µm, 1 µm or 2 µm to realize a relatively low pressure loss. The pore size according to one embodiment is less than about 15 µm, about 12 µm, or about 10 µm. It will be appreciated that the optimum pore size depends to a large extent on the specific application of the membrane and hence various ranges between (and in some cases outside) the high end of the range will be particularly advantageous.

According to at least one embodiment, the pores of the membrane are arranged so that the gas permeation as indicated by the Gurley number is below 5 s/50 ml. The Gurley value is the time it takes for a volume of air to pass through an area of the membrane and it is measured as described in the experimental section. In other words, the lower the Gurley the faster the gas penetration through the membrane. A suitable range of Gurley numbers (i.e. the optimum combination of highest and lowest Gurley numbers) depends on the actual application. In one or more embodiments the Gurley number is below 5 s/300 ml.

The polyethylene may be a single polyethylene or a mixture of polyethylenes or copolymers thereof and optionally other components discussed below. Hence, according to one embodiment, a polyethylene membrane comprises at least 50 wt-% polyethylene, specifically at least 80 wt-% polyethylene. The membrane may consist of polyethylene. The polyethylene can have a relatively high average molecular weight to increase the strength of the membrane. A high content of ultra-high molecular weight polyethylene (hereinafter UHMWPE) is advantageous in facilitating manufacturing of free-standing membranes. In one embodiment, at least 20 wt-% of the porous polyethylene membrane is UHMWPE and specifically at least 50 wt-% of the polyethylene is UHMWPE, as UHMWPE allows for very high strength through stretching of the membrane. UHMWPE is polyethylene with a weight average molecular weight of more than about 500,000 g/mole, such as 500,000-20,000,000 g/mole. The lower limit corresponds to the required (lower) tensile strength of the membrane whereas the upper limit corresponds to an approximate limit where the material becomes too rigid to process easily. The UHMWPE may be a bi-modular or a multi modular mixture, which increases processability. A membrane based on UHMWPE has the advantage that it is highly dimensionally stable, also under stress, and that thin microporous membranes with high porosity can be made. In specific embodiments, a high content of UHMWPE is advantageous as UHMWPE may be processed by extrusion and afterwards being stretched to form a very strong and affordable membrane as well as a membrane that is both chemically and mechanically stable (e.g. with regard to thermal cycling and swelling behavior) even when blended with a fraction of another component. Furthermore, in a specific embodiment, less than 80 wt-% of the porous polyethylene film is UHMWPE and more specifically less than 70 wt-% of the porous polyethylene film is UHMWPE.

Another embodiment has a fraction of polyethylene with high molecular weight polyethylene (hereinafter HMWPE). HMWPE is polyethylene with a weight average molecular weight of about 100,000 g/mole-500,000 g/mole. The lower limit of molecular weight corresponds to the molecular weight where substantial strength increase may be realized by stretching and the upper limit of molecular weight corresponds to the transition to UHMWPE. In one embodiment, at least 5 wt-% of the porous polyethylene film is HMWPE and specifically at least 20 wt-% of the porous polyethylene film is HMWPE, such as at least 30 wt-% of the porous polyethylene film. The content of HMWPE increases the processability and allows for fine tuning of for example pore size and membrane structure of the membrane as compared to pure UHMWPE membranes. Furthermore, in specific embodiments, less than 80 wt-% of the porous polyethylene film is HMWPE, such as less than 50 wt-% of the porous polyethylene film as a too high content of HMWPE may lead to reduced mechanical strength of the membrane. However, such membranes may still be usable for example for supported membranes.

In one embodiment, the porous polyethylene film comprises at least 50 wt-% polyethylene and specifically a total of 1-50 wt-% of at least one component selected from the group consisting of metal, metal oxide, ceramic powder, oxidized PE, PEO, PTFE, micronized wax blends, PE copolymers (such as PE-PTFE, PE-EVA, PE-AA, PVA, PE-vinylchloride or PE-epoxy), activated carbon, carbon black, polymeric resins other than PE, and combinations thereof. The other components may be added to promote desired properties, such as for example provide electrical conductivity, change color, strength, toughness, reduce cost, increase flexibility, modify hydrophobicity, introduce hydrophilicity, or as fillers. In specific embodiments, the porous polyethylene film comprises at least 85 wt-% polyethylene and a total of 1-15 wt-% of at least one component selected from the above group. Besides during the above described blending, these components may also be added to the polyethylene membrane via for example a coating or a plasma polymerisation process. Adding additives in the polyolefin porous membrane can be advantageous. For example, additional carbon fibers, nanotubes, glass fibers or other fibers can be beneficial for the conductivity and/or reinforcement of a porous polymer membrane, thereby allowing for increased freedom of design and/or increasing the lifetime of such materials.

In a specific embodiment, the porosity is not evenly distributed. In one embodiment, the structure of the membrane is a layered structure of fibril webs arranged substantially parallel to an outer main surface of the membrane, herein referred to as multi layered structure or lasagna-like structure due to the visual similarity of the arrangement of the fibril webs with the pasta sheets in lasagna, where the fibril webs touch adjacent fibril webs in some areas and are separated by another matter (for example air, solvent or water phase) in other areas.

The multi layered structure arises due to the preparation method of the membrane and hence connected to the fact that the membrane is prepared by blending followed by extrusion and stretching. The multi layered structure is highly advantageous for a range of separation applications, and it is highly surprising that the multi layered structure could be utilized for gas filtration media, HEPA filters, ULPA filters etc. For example, according to one embodiment, membranes with the multi layered structure as described herein, provide superior filtration properties. It could be theorized without being limited thereto, that this is due to the highly tortuous pore structure, which forces the gas to follow a relatively long path through such membranes.

The density of the fibril webs of the multi layered structure may vary and depend on the thickness of the individual webs and the overall porosity of the membrane. In one embodiment the membrane has 3 to 15 fibril webs/30 μm of membrane cross section, the fibril webs being arranged substantially parallel to an outer surface of the membrane. In a specific embodiment, a cross section of the membrane has 4 to 12 fibril webs/30μm, or alternatively, 6 to 10 fibril webs/30 μm of membrane cross section.

The thickness of the individual fibril webs of the multi layered structure may also vary and depend on the density of the webs and the overall porosity of the membrane. In one embodiment of the membrane according to the invention at least 70% or 90% of the fibril webs have a thickness of 0.02 to 2.5 μm parallel to an outer surface of the membrane.

In a highly specific embodiment, the membrane is a stretched polyethylene membrane having a combination of microfibers with internal nanofibers. The microfibers have a size of about 1-10 um in diameter and length of 5-50 um, and the nanofibers have a size 10-150 nm in diameter and 2-20 um in length. By the diameter of the fiber is herein meant that the average diameter of the fiber is within this range. By the length of fiber is herein meant that the average length of the fiber is within this range. The combination of microfibers and nanofibers is highly advantageous in that the microfibers typically provide the mechanical strength and rigidity, which allows for manufacturing of self supported membranes having very low pressure loss, $\Delta P$, across the membrane. The nanofibers allow for capture of particles as small as about 0.01 μm thereby improving the efficiency of the membrane. In addition to this, the multilayered structure improves filtration efficiency and most important filtration consistency even further for the membrane.

According to specific embodiments, the porosity of the membrane is relatively high. The porosity is defined as $(1-BW/(rho \times d))*100\%$, wherein BW is the base weight of the membrane [in $g/m^2$], rho the density of the membrane [in $g/m^3$] and d the thickness of the membrane [in m]. For some applications, where the gas flow is limited, a porosity of about at least 70 vol-% is advantageous. In most cases having a porosity of at least 80 vol-% or even at least 90 vol-% would be very useful, as this provides a very open structure, with high overall porosity and hence relatively low pressure loss. The maximum porosity depends on the choice of material and the construction of the system (for example if the membrane is supported or not supported). In specific embodiments, the porosity of the membrane is at most 95 vol-%, and more specifically that the porosity is at most 90 vol-%.

The membranes described above may be manufactured by several methods. In one embodiment the hydrophilic porous polymer membrane according to the invention is manufactured by mixing at least one polyethylene, specifically at least one of UHMWPE and HMWPE, and optionally additional component(s) with a solvent to form a mixture. Then the mixture is extruded and the solvent is removed. In one embodiment, the solvent is removed by evaporation before stretching of the base member. In this way, a base member is created with a unique porous structure, which enhances the formation of the highly advantageous layered structure of fibril webs in the final stretching operation. Further aspects regarding the manufacturing are known in the art and described for example in U.S. Pat. Nos. 5,376,445, 5,370,889 and 5,507,993 (incorporated herein by reference in their entirety).

The mixture may be a highly viscous liquid typically in the form of a gel or an emulsion. The term extrusion as used herein encompasses the extrusion techniques known in the art, such as gel techniques, solvent extrusion, etc. In one embodiment, the blend is formed inside an extruder, such as an extruder with one or more screws, to process the blend into a highly viscous mass, such as a gel or an emulsion, which mass is drawn through a die, resulting in a thick tape. Solvent is removed from the tape to form a base member by evaporation or extraction. In one embodiment of the method, the solvent is removed after the stretching.

The solid content of the mixture prior to extrusion impacts processability of the membrane as well as the properties of the final membrane. In one embodiment, the dry content in the blend (i.e. the sum of polyolefin polymer and optional additives) is about 5 to 30 wt-% of the total weight of the dry content and the solvent. In another embodiment, the dry content of the blend is about 10 to 25 wt-% of the total weight of the dry content and the solvent. Additives are functional compounds such as for example rheology modifiers (such as oils), colorants and fillers (i.e. passive elements added for example to reduce weight or cost of the membrane). Additives may for example be added in the mixture to increase processability or to affect the properties of the final membrane. Additives may also be added after stretching for example as a chemically or physically bonded coating.

The way of processing (extrusion/stretching) is much more favorable than the traditional solvent casting method to produce membranes. Solvent cast membranes require a high cost and very well defined flat support for making the casting equally over the surface, in order to obtain a consistent film thickness. The method described in the present embodiment does not need a support for making a membrane, or if required can use a low cost support, like a non-woven support.

A suitable thickness for the membrane layer is in the range of about 0.001 to about 0.002 inches (about 0.00254 to about 0.00508 cm, respectively).

Composite Filter Media

In a specific embodiment, the backer is assembled with a membrane such that the backer is on the upstream side of the filter, which aids in reducing the potential of glass fiber shedding from the composite filter media and being carried downstream of the filter. In another specific embodiment, the low boron backer is sandwiched between two synthetic membrane layers. The backer layer and the membrane layer can be bonded to each other by any of a variety of suitable methods, including, but not limited to, ultrasonic welding, gluing, thermo bonding or by laser welding.

The properties of the filter depend on the actual application of the membrane. The four main groups of applications are as ASHRAE filters, prefilters, HEPA filters and ULPA filters. For ASHRAE filters, it is typically required to have an overall collection efficiency of at least 15% and specifically at least 90% when air is flowing through the membrane at a flow velocity of 5.3 cm/second. The collection efficiency is measured using dioctyl phthalate having a particle size of 0.3 µm (corresponding to U.S. Military Standard MIL-STD-282 (1956)). For prefilter media, the collection efficiency can be from about 85%-99% under the same conditions. For HEPA filters, it is typically required to have a collection efficiency of at least 99.97%, under the same conditions. For ULPA filters, the collection efficiency should be at least 99.999% at the most penetrating particle size when air is flowing through the membrane at a flow velocity of 5.3 cm/second. The collection efficiency is measured using a TSI 8160 (available from TSI Incorporated, Shoreview, Minn.) type efficiency tester capable of measuring various particle sizes of from about 0.01 to 0.4 µm using dioctyl phthalate (DOP) or equivalent oil to generate various particle sizes.

For air or HEPA filter membranes, the penetration typically varies as a function of the particle size for particles having a size in the range of 0.01-0.3 µm in that the penetration tends to go through a maximum in this range. For the membranes according to embodiments the invention, the highest penetration in the 0.01-0.3 um range is for particles having a size of about 0.05 µm, when measured at 5.3 cm/s. The particle size at the highest penetration is also called most penetration particle size or mpps. The difference between the penetrations at the mpps and the penetration at 0.3 um is specifically within a few 10 log scales.

The membrane filter can readily be prepared on an industrial scale in a batch process or a continuous process. In one embodiment, the time (stretching speed and the stretching factor) for stretching in the MD direction provides the superior combination of high collection efficiency and extremely low pressure loss.

Test Methods:

Pore Size of Membrane:

The mean flow pore size, determined with a PMI apparatus, is based on air permeability and uses a wetting fluid. The common mean flow pore size method with the PMI apparatus is based on ASTM F316-03. Samples of 25 mm in diameter were wetted with a low surface tension fluid, type Fluor Inert, FC-40, and placed in a holder. A differential air pressure removes the wetting fluid from the sample. After this wet run, a dry run (dry flow) is applied. PMI software calculates the mean flow pore size by using the differential pressure at which the wet flow is equal to 50% of the dry flow.

Air Permeability of Membrane:

The Gurley test method (according to ISO 5636-5) covers the determination of the resistance of membranes to the passage of air. The method is applicable to membranes permitting the passage of air up to 50 ml in one second or more. In this test, a Gurley Densometer from Gurley Precision Instruments, type 4110 is used, recording the time with an accuracy of 0.1 seconds; with a cylinder capacity of 50 milliliters, a cylinder weight of 567 gram and a measuring surface of 6.45 square centimeters (1 square inch). After calibration, a strip of a membrane is cut across the width of the roll. Furthermore a smooth, undamaged test specimen is placed over the clamping plate orifice and clamped. In this air permeability test method, no wetting liquid is used. The measurement is started, and the time is determined with an accuracy of 0.1 seconds, which is required for 50 ml of air to pass through the test specimen. For membranes with very fast gas penetration, the penetration time is measured for higher volumes of air, say 300 ml. Also a calibrated orifice (from Gurley Precision Instruments) is used, having a restriction of a factor 10. When this orifice is installed, an air volume of 100 ml is applied.

Thickness of Membranes:

The thickness is measured with a Mahr Millitron, with a 12 mm in diameter foot print using 0.5 N tension.

Particle Collection Efficiency Test and Pressure Drop of Membranes:

Particle collection efficiency is measured by an automated tester (Model 8160 from TSI, Inc., St. Paul, Minn.). A 6 inch (152.4 mm) diameter flat sheet sample of the filter medium is enclosed in the filter holder with gasket seals mounted horizontally. The circular filter holder has two zones, a center test zone which allows air flow and test particles to pass through and an outer guard zone to prevent leakage of air flow between the test zone and the atmosphere. The differential pressure between the two zones is adjusted to near zero so that no outside air leaks into the test zone. The test zone can have an area of approximately 100 $cm^2$ (11.3 cm diameter) ((15 inch (4.4 inch diameter)). A dioctyl pthalate (DOP) solution is atomized to generate a polydisperse aerosol. The aerosol particles are then classified according to their electrical mobilities to generate monodisperse particles from 0.02 to 0.5 micrometer in diameter. The particles are then passed to the test filter. Two condensation nucleus particle counters simultaneously measure the particle concentrations upstream and downstream of the filter to determine the particle collection efficiency. The efficiency is reported as the percentage of particles collected by the filter relative to the upstream challenge particles.

The pressure drop is recorded in mm of water gauge. The test is performed at a medium face velocity of 5.3 cm/sec.

When the particle collection efficiency of the non-abraded section of each sample is greater than 99%, particles which penetrated the media samples during the efficiency test are assumed to pass through the abraded sections of the samples.

The test is performed at ambient room temperature (70° F. (21.1° C.)) and humidity conditions (40%). Samples to be tested were not conditioned at specific temperature and humidity conditions prior to testing.

The invention is elucidated by means of the following examples without being restricted thereto.

EXAMPLES AND COMPARATIVE EXPERIMENTS

Samples were prepared as shown in the attached Tables. A SOLUPOR membrane (available from Lydall Solutech B.V. and generally described in both composition and method of manufacture in Sample 1 of EP 1 921 702 A1, entitled Humidifier Membrane, which is incorporated herein by reference) was tested without any backer and represented as "PE membrane—no backer" in the Tables. The sample labeled "PE membrane with Backer" in the Tables below was a composite made by laminating the SOLUPOR polyethylene membrane to an Owens Corning Grade designation CS 9503C-7.5 micron diameter, ¼ in. length chopped strand E-Glass fiber backer with 12% organic binder. In addition, a commercially available product comprising a spunbonded scrim backer layer laminated to a PTFE membrane (model/type no. 6522, commercially available from Nitto Denko) was tested, labelled "PTFE membrane with spunbonded backer" in the Tables. Additionally, a conventional composite filter media labelled "Microglass ULPA" (LYDAIR® MG High Alpha ULPA, grade no. 6550, available from Lydall, Inc.) made from borosilicate glass microfibers and E-glass chemistry chopped strand glass bound together by acrylic resin and produced by a wet laid papermaking process, was also tested.

For samples incorporating a low boron backer layer according to one aspect of the present invention, the backer layer was produced on a paper machine using a wetlaid paper making process. The low boron chop strand fibers along with KURALON binder fibers were dispersed in a pulper at a pH of about 8-8.5 and agitated for 5 minutes. This dispersion, with a consistency of approximately 1.0% fiber, was transferred to a chest and then pumped to a headbox of the paper machine at a reduced consistency of less than about 0.1% fiber, where it was formed on a wire using vacuum. Binder was applied to the media in the wet state before drying to obtain an organic content averaging 12% in the finished product. The backer layer was then transferred to a dryer section using fabric felts. The backer layer was then dried using an oven and/or dryer cans and then wound up on a roll. The thus formed low boron backer layer included approximately 88% 1/4 DE low boron chop strand fiber (available from Owens Corning, trade name CS 691A-6.5 micron diameter ¼ in. length), 3% KURALON polyvinyl alcohol binder fiber (available from Kuraray Co., trade name KURALON VPB 105-2×4 mm), and 9% acrylic latex (available from Lubrasol Co., trade name HYCAR® 26450) was then bonded to the membrane using conventional methods.

Results

Boron Content Measurements

Boron was measured and compared versus conventional composite filter media.

Boron Content Testing

Two glass fiber backer materials were measured for boron content as fiber samples. The sample labeled Advantex ¼" was Advantex® low boron chop strand glass fiber obtained from Owens Corning in Toledo, Ohio. The sample labeled Isorca ¼" was E-glass chop strand fiber obtained from Isorca in Granville, Ohio. Sample 1204GX is a backer sample made from Owens Corning E-glass chemistry chop strand fiber, having a similar chemistry to the Isorca sample. Sample 1205AX is a backer sample made with the low boron ADVANTEX chop strand fiber. The low-boron backers were made as described above. The data in Table 2 below show the difference in boron concentration of the e-glass chemistry chop strand fiber compared to the low boron chop strand fiber and backers made from the two types of chop strand fiber. The samples were dissolved in hydrofluoric acid and then tested for boron content. The data shows large differences in boron concentration between the fibers and backers.

Organic Outgassing Measurements

In addition to the presence of boron, a second problem in the field of composite filter media is the potential for out gassing of organic components from the filter during use. To evaluate organic outgassing from known filter materials and composites, the above samples were tested by thermal desorption gas chromatography mass spectrometry (TD-GCMS), and the organic outgassing results were as shown in Table 4 below.

Organic out gassing on samples was measured. This test method was designed to analyze semi-volatile organic compounds in the boiling point range of n-heptane (boiling approximately 100° C.) to n-octacosane (boiling point approximately 430° C.). The results were expressed as n-decane and reported in units $ng/cm^2$ (nanograms per square centimeter).

Identification of each compound detected was first attempted by searching a Wiley library of 275,000 mass spectra. In cases where no matches were found, the analyst interpreted the mass spectra to give a best estimate of the most probable compound or class of compounds.

Presentation of Data

Ranges: Organic compounds were classified into three boiling ranges, low-boiling (C7-C10), medium-boiling (>C10-C20) and high-boiling (>C20), based on comparisons with the retention times of C7-C28 n-hydrocarbon external standard. As will be readily understood by those of ordinary skill in the art, the "C#" refers to the length of the carbon chain (e.g., C7 means the hydrocarbon is seven carbon atoms in length). In general, the longer the carbon chain, the higher the boiling temperature of the compound s. Semiquantitative amounts of the organic compounds in each boiling range are calculated by using the integrated TIC (total ion count) of that boiling range and the response factor for an n-decane external standard.

Semiquantitated compounds: Amounts of individually identified compounds were estimated using TIC area of that compound and response factor of n-decane external standard.

Testing Protocol:

Each sample was placed in an individual inert chamber and outgassed for one hour at 50, 75 and 100° C. Outgassed compounds were trapped onto sampling tubes containing multiple beds of proprietary adsorbents. The sampling tubes were then analyzed by TD-GC-MS (Thermal Desorption-Gas Chromatography-Mass Spectrometry).

The GC used a non-polar poly (dimethylsiloxane) phase capillary column. The following temperature program was used for the GC: Initial temperature held at 35° C. for 3.5 minutes then ramped at a rate of 10° C./minute to 280° C. then held at the final temperature for 10 minutes. Helium was used

TABLE 2

Boron Concentration and Limits

| | | Sample Concentration | | Minimum Reporting Limit | |
|---|---|---|---|---|---|
| Sample | Analyte | Weight Percent (%) | Parts per Million (PPM) | Weight Percent (%) | Parts per Million (PPM) |
| Advantex ¼" | Boron | <0.000712 | <7.12 | 0.000712 | 7.12 |
| Isorca ¼" | Boron | 2.04 | 20400 | 0.0698 | 698 |
| 1204GX | Boron | 1.77 | 17700 | 0.0637 | 637 |
| 1205AX | Boron | 0.00145 | 14.5 | 0.000602 | 6.02 | as the carrier gas for the GC-MS. As a calibration standard, toluene-d8, was added to each sampling tube during the analysis.

Actual sampling information for each Sample was as follows in Table 3:

cussed in more detail below. In particular, the "PTFE membrane with spunbonded backer" sample represents commercially available no-boron composite filter media for comparison with the low-boron composite filter media of the invention.

TABLE 3

| Sample ID | Weight | Dimensions | Temperature/Time |
|---|---|---|---|
| PE membrane- 1, with backer | 1.14163 grams | 10.0 cm × 10.0 cm | 50° C./1 hour |
| PE membrane- 2, no backer | 0.05820 grams | 10.0 cm × 10.0 cm | 50° C./1 hour |
| Microglass- 3, ULPA | 0.87575 grams | 10.0 cm × 10.0 cm | 50° C./1 hour |
| PTFE membrane- 4, with spunbonded backer | 0.71394 grams | 10.0 cm × 10.0 cm | 50° C./1 hour |
| PE membrane- 1, with backer | 1.12943 grams | 10.0 cm × 10.0 cm | 75° C. 1 hour |
| PE membrane- 2, no backer | 0.07922 grams | 10.0 cm × 10.0 cm | 75° C./1 hour |
| Microglass- 3, ULPA | 0.080488 grams | 10.0 cm × 10.0 cm | 75° C./1 hour |
| PTFE membrane- 4, with spunbonded backer | 0.73528 grams | 10.0 cm × 10.0 cm | 75° C./1 hour |
| PE membrane- 1, with backer | 1.16378 grams | 10.0 cm × 10.0 cm | 100° C./1 hour |
| PE membrane- 2, no backer | 0.06374 grams | 10.0 cm × 10.0 cm | 100° C./1 hour |
| Microglass- 3, ULPA | 0.86313 grams | 10.0 cm × 10.0 cm | 100° C./1 hour |
| PTFE membrane- 4, with spunbonded backer | 0.74498 grams | 10.0 cm × 10.0 cm | 100° C./1 hour |

Results

TABLE 4

ORGANIC OUT GAS TESTING RESULTS

| Temp. (° C.) | | PE membrane - no backer | PE membrane with backer | PTFE membrane with spunbonded backer | MICROGLASS ULPA |
|---|---|---|---|---|---|
| 0 | LOW BOILERS ($C_7$-$C_{10}$) | 0 | 1.2 | 2.2 | 0.9 |
|   | MEDIUM BOILERS ($C_{10}$-$C_{20}$) | 13.7 | 156 | 163 | 6.6 |
|   | HIGH BOILERS (>$C_{20}$) | 0 | 7.4 | 1.5 | 3.9 |
|   | TOTAL (ng/cm$^2$) | 13.7 | 165 | 166 | 11.4 |
| 5 | LOW BOILERS (C7-C10) | 1.1 | 12.9 | 7.4 | 2.5 |
|   | MEDIUM BOILERS ($C_{10}$-$C_{20}$) | 48.2 | 259 | 415 | 21.9 |
|   | HIGH BOILERS (>$C_{20}$) | 8.3 | 79.1 | 12.7 | 38.2 |
|   | TOTAL (ng/cm$^2$) | 57.6 | 350.6 | 435.1 | 62.6 |
| 00 | LOW BOILERS ($C_7$-$C_{10}$) | 1.9 | 56 | 27.5 | 6.9 |
|   | MEDIUM BOILERS ($C_{10}$-$C_{20}$) | 66.6 | 413 | 663.4 | 52.4 |
|   | HIGH BOILERS (>$C_{20}$) | 26.6 | 132 | 71.6 | 55.2 |
|   | TOTAL (ng/cm$^2$) | 95.1 | 601 | 762.6 | 115 |

These results establish a range of organic outgassing from known filter materials and filter composites for use in comparison with the filter composites of the invention, as dis- Additional Outgas Testing Outgas testing was run using Dynamic Headspace TD-GC-MS procedure to measure the potential for off gassing of materials used in clean space applications. Testing was conducted on several samples as shown in Table 5. Sample 1 and Sample 2 were commercially available ePTFE all-synthetic laminated membrane samples composed of ePTFE membrane laminated to a synthetic spunbonded backer for use in filters for clean space applications. Also tested were a composite made of SOLUPOR M3402 adhered to low boron backer 1205 AX with a polyolefin hot-melt glue sprayed onto the backer at 350° F.

TABLE 5

Organic Outgassing (Off-line at 100 degrees C. for 1 Hour) by Dynamic Headspace TD-GC-MS

| Parameter | RL | Units | Sample 1 | Sample 2 | SOLUPOR M3402-1205 AX |
|---|---|---|---|---|---|
| Low boilers $C_7$-$C_{10}$ | 0.1 | ng/cm$^2$ | 120 | 31 | 3.4 |
| Medium boilers > $C_{10}$-$C_{20}$ | 0.1 | ng/cm$^2$ | 2000 | 1300 | 1100 |
| High boilers > $C_{20}$ | 0.1 | ng/cm$^2$ | 32 | 22 | 61 |
| Sum >= $C_7$ | 0.1 | ng/cm$^2$ | 2200 | 1400 | 1200 |

The results in Table 5 show that total outgassing of organics from the SOLUPOR M3402-1205AX membrane laminate are generally lower compared to the commercially available ePTFE media (Sample 1 and Sample 2). Outgassing of low boilers was found to be most significantly reduced in the SOLUPOR M3402-1205AX low boron laminate. Outgassing of medium boilers was also reduced compared to Sample 1 and Sample 2. Outgassing of high boilers from the SOLUPOR membrane laminate was increased compared to Sample 1 and Sample 2, but the total out gassing of organics from the SOLUPOR membrane low boron backer composite was still less than the commercially available ePTFE membrane products.

Outgas testing was repeated as described above off-line at 50° C. for 1 hour. The results are shown in Table 6.

TABLE 6

Organic Outgassing (Off-line at 50 degrees C. for 1 Hour) by Dynamic Headspace TD-GC-MS

| Parameter | RL | Units | Sample 1 | Sample 2 | SOLUPOR M3402-1205 AX |
|---|---|---|---|---|---|
| Low boilers $C_7$-$C_{10}$ | 0.1 | ng/cm$^2$ | 0.70 | 11 | 0.90 |
| Medium boilers > $C_{10}$-$C_{20}$ | 0.1 | ng/cm$^2$ | 6.7 | 480 | 20 |
| High boilers > $C_{20}$ | 0.1 | ng/cm$^2$ | * | 1.4 | * |
| Sum >= $C_7$ | 0.1 | ng/cm$^2$ | 7.4 | 490 | 21 |

These results also demonstrate that outgassing from the inventive composite filter media is within the range observed for commercially available low-boron (or no boron) filter media. Outgassing of each organic component for the inventive composite filter media was much improved compared to Sample 2, but only comparable to or somewhat higher than Sample 1.

Overall, the SOLUPOR membrane low boron backer composite has modestly improved or comparable performance with respect to out gassing of individual organic components and total organics compared to the commercial available ePTFE membrane products used in filters for clean space applications.

Pleatability

Samples were pleated and compared with commercially available backer materials including those made with E-glass, as well as low boron chopped strand glass fiber backer layers and a mixture of at least 90% low boron chopped strand glass fiber with 10% synthetic fiber. Samples made with low boron chopped strand glass fiber backer layers included at least about 40%, 50%, 55%, 60%, 65%, 70%, 75%, 80%, 85%, 90%, 95% and up to 100% low boron chopped strand glass by weight of the backer, excluding binder. The pleating was rated as Acceptable or Unacceptable. Low boron chop strand glass backers laminated to SOLUPOR membranes according to one aspect of the present invention exhibited excellent pleatability and were acceptable.

Figure 3:
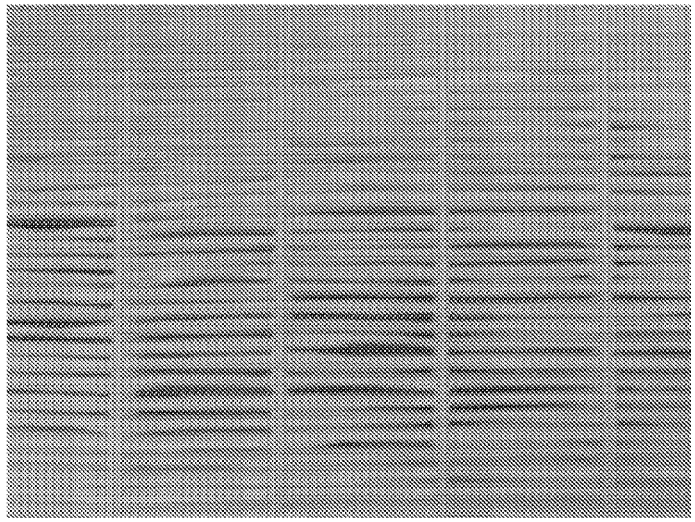
FIG. 3 is a photograph of an example of a poorly pleated filter media.
Figure 3:
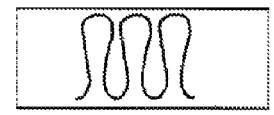
Figure 4:
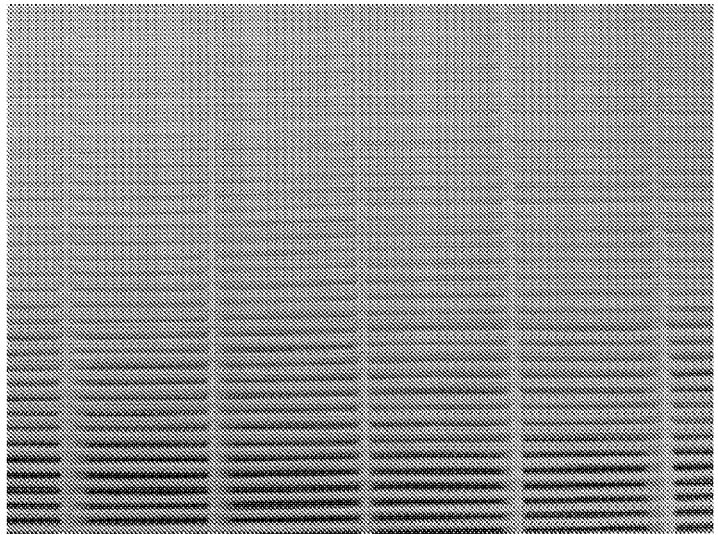
FIG. 4 is a photograph of an example of an acceptable pleated filter media.
Figure 4:
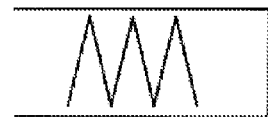

An example of bad or unacceptable pleating is shown in FIG. 3, showing pleat tips that are uneven, have flat spots and the pleat tips do not have sharp, V-shaped pleats. FIG. 4 shows an example of acceptable pleating according to one aspect of the present invention. The material shown in FIG. 3 was a SOLUPOR membrane as described above which was laminated to a wetlaid polyester backer, while the material shown in FIG. 4 was the SOLUPOR membrane with chop strand glass backer discussed above and represented in Table 3 (labelled "PE membrane with backer"). The pressure drop of the filter is generally proportional to the velocity of the air. Typically, the equation Q=VA is utilized, where Q is the volume flow, V is the velocity, and A is the area of media. For a perfect filter, as the velocity is doubled, so is the pressure drop. Entrance and exit losses can range from 10-20% in a filter. If the pleat tip appearance is sharp (i.e., v-shaped), as shown in FIG. 4, these losses can be minimized. Similar sharp, v-shaped pleating can be obtained using filter media comprising a low-boron chopped strand glass fiber backer laminated to a synthetic membrane as disclosed herein.

The composite filter media of the invention has the significant advantage of improved pleatability and ease of manufacture while still providing performance and functional characteristics that are comparable to commercially available low boron (or no boron) filter media.

It is contemplated that any synthetic membrane suitable for lamination to a glass backer will provide an acceptably pleatable composite filter media according to the invention that is manufacturable using conventional pleating machines. Such membranes include polyethylene, PTFE, ePTFE, nylon and ultra high molecular weight polyethylene, and other synthetic membranes as are known in the art for use in filter media. Some membranes such as ePTFE are more fragile and require careful handling while others such as UHMWPE are tougher; however, it is within the skill in the art to adapt the methods of the invention to accommodate the particular characteristics of a particular synthetic membrane to produce an acceptably pleatable composite filter membrane as disclosed herein.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A composite filter media comprising:
    a backer layer comprising greater than 50% by weight chopped strand glass fiber, the chopped strand glass fiber essentially free of boron; and
    at least one synthetic membrane layer laminated to the backer layer, the composite filter media in a pleated configuration.

2. The composite filter media of claim 1, wherein the synthetic membrane layer is selected from the group consisting of polyethylene, PTFE, nylon, polyester, polypropylene, and combinations thereof.

3. The composite filter media of claim 2, wherein the membrane layer has a a particle filtration, PF, value of at least 10, which is calculated according to the formula:

$$PF = (-\log(\text{Penetration (\%)}/100)/\text{Pressure loss (mm H}_2\text{O})) \times 100$$

in which the Penetration (%)=100-Collection efficiency at a Pressure loss (unit: mm H$_2$O) measured when air is flowing through the membrane at a flow velocity of 5.3 cm/second and a collection efficiency (unit: %) measured using dioctyl phthalate (DOP) or di-ethyl-hexyl-sabacate (EHS) having a particle size of 0.3 μm (U.S. Military Standard MIL-STD-282 (1956)), specifically the PF value of the membrane is at least 20, and most specifically the PF value of the membrane is at least 30, wherein the porous membrane is a polyethylene membrane.

4. A method of manufacturing a composite filter media comprising attaching a backer layer comprising greater than 50% by weight chopped strand glass fiber essentially free of boron and a synthetic membrane to form a pleated composite filter media; and pleating the composite filter media, to provide a filter media in which the pleated composite filter media shows excellent pleating characteristics on existing glass pleaters resulting from the amount of chopped strand glass fibers.

5. The composite filter media of claim 1, wherein the composite filter media exhibits one or more of the following properties: low boron outgassing; low organic outgassing; and sufficient stiffness in the composite to pleat well on existing glass pleaters as well as sufficient stiffness to add structural integrity to the finished filter to minimize pressure drop at application velocity in use or rated flow.

6. The composite filter media of claim 5, wherein the low boron chopped strand glass fiber has an average fiber diameter of from about 3.8 to about 10 microns.

7. The composite filter media of claim 1, wherein the low boron chopped strand glass fiber has an average fiber diameter of from about 6.5 to about 7.5 microns.

8. The composite filter of claim 6, wherein the backer further comprises synthetic fiber selected from one or more of polyester, nylon, polypropylene, rayon, low melt fibers, acrylic fibers, polyvinyl alcohol, bicomponent fibers, and cellulosic fibers.

9. The composite filter media of claim 8, wherein the backer has a porosity ranging from about 200 to 800 cfm.

10. The composite filter media of claim 8, wherein the backer has a porosity ranging from about 300 to about 600 cfm., so as to not significantly increase the resistance of the composite loading to lower CFE values.

11. The composite filter media of claim 1, wherein the backer is located at one or more of an upstream or downstream side of the filter.

12. The composite filter media of claim 11, wherein the backer is located on the upstream side of the filter to reduce fiber shedding.

13. The composite filter media of claim 1, wherein the composite media filter comprises the backer sandwiched between two synthetic membrane layers.

14. The composite filter media of claim 1, wherein the media is essentially free of boron outgassing in use.

15. A backer for use with a composite filter media comprising chopped glass strand essentially free of boron, the chopped glass strand in an amount greater than 50% by weight; and
    a binder, wherein the backer is pleatable with a synthetic membrane layer.

* * * * *